(12) United States Patent
Bestman et al.

(10) Patent No.: US 12,298,459 B2
(45) Date of Patent: May 13, 2025

(54) FLOW-AFTER-FLOW TESTS IN HYDROCARBON WELLS

(71) Applicant: Saudi Arabian Oil Company, Dhahran (SA)

(72) Inventors: Somiari Bestman, Dhahran (SA); Rasheed M. Almahdi, Dhahran (SA); Farrukh Moid, Dhahran (SA); Mutlaq A. Subaie, Dhahran (SA); Assem A. Alyomny, Dhahran (SA); Mohannad S. Alharbi, Dhahran (SA); Maryam A. Alblushi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 918 days.

(21) Appl. No.: 17/347,251

(22) Filed: Jun. 14, 2021

(65) Prior Publication Data

US 2022/0397698 A1    Dec. 15, 2022

(51) Int. Cl.
*G01V 20/00* (2024.01)
*G06F 16/25* (2019.01)
*G06F 30/27* (2020.01)

(52) U.S. Cl.
CPC ............ *G01V 20/00* (2024.01); *G06F 16/252* (2019.01); *G06F 30/27* (2020.01)

(58) Field of Classification Search
CPC ........ G01V 20/00; G06F 16/252; G06F 30/27
USPC .......................................................... 703/10
See application file for complete search history.

(56) References Cited

U.S. PATENT DOCUMENTS

| | | |
|---|---|---|
| 6,585,044 B2 | 7/2003 | Rester et al. |
| RE42,245 E | 3/2011 | Thomas et al. |
| 8,195,401 B2 | 6/2012 | Ella et al. |
| 8,653,979 B2 | 2/2014 | Obenchain |
| 8,670,966 B2 | 3/2014 | Rashid et al. |
| 8,676,721 B2 | 3/2014 | Piovesan et al. |
| 9,063,250 B2 | 6/2015 | Pop |
| 9,187,984 B2 * | 11/2015 | Usadi ...................... G06F 30/23 |
| 9,200,511 B2 * | 12/2015 | Hon ........................ E21B 47/06 |
| 9,567,843 B2 | 2/2017 | Saeed et al. |
| 9,714,860 B2 | 7/2017 | Obenchain |

(Continued)

FOREIGN PATENT DOCUMENTS

| | | |
|---|---|---|
| WO | WO 2020150540 | 7/2020 |
| WO | WO 2022159567 | 7/2022 |
| WO | WO 2022204723 | 9/2022 |

OTHER PUBLICATIONS

Kabir et al. ("Estimating Drainage-Area Pressure with Flow-After-Flow Testing", SPE, 2011, pp. 1-19) (Year: 2011).*

(Continued)

*Primary Examiner* — Iftekhar A Khan
(74) *Attorney, Agent, or Firm* — Fish & Richardson P.C.

(57) ABSTRACT

Disclosed are methods, systems, and computer-readable medium to perform operations including: receiving historical production data associated with a hydrocarbon well; preprocessing the historical production data to remove noise from the historical production data; using one or more machine-learning algorithms and the preprocessed historical production to train a simulation model to simulate a flow-after-flow test for the hydrocarbon well; and testing the simulation model to determine that the simulation model passes predetermined testing criteria.

20 Claims, 4 Drawing Sheets

(56) References Cited

U.S. PATENT DOCUMENTS

| | | | |
|---|---|---|---|
| 9,946,974 B2* | 4/2018 | Burch | E21B 43/00 |
| 10,198,535 B2* | 2/2019 | Usadi | G06F 30/23 |
| 10,359,542 B2* | 7/2019 | Kayode | E21B 47/06 |
| 10,487,649 B2* | 11/2019 | Tilke | E21B 47/00 |
| 10,584,577 B2 | 3/2020 | Tiss et al. | |
| 10,689,972 B1 | 6/2020 | Zhao et al. | |
| 10,746,015 B2 | 8/2020 | Munda et al. | |
| 10,815,761 B2 | 10/2020 | Arthur et al. | |
| 11,008,837 B2 | 5/2021 | Kim et al. | |
| 11,308,409 B1 | 4/2022 | Ortiz | |
| 11,555,943 B2* | 1/2023 | Ayub | G06N 3/084 |
| 12,085,687 B2* | 9/2024 | Lin | G06N 20/00 |
| 2002/0099505 A1 | 7/2002 | Thomas et al. | |
| 2002/0138241 A1* | 9/2002 | Storm, Jr. | E21B 43/00 703/10 |
| 2007/0016389 A1* | 1/2007 | Ozgen | G01V 20/00 703/10 |
| 2010/0161300 A1* | 6/2010 | Yeten | E21B 43/00 703/10 |
| 2010/0250215 A1 | 9/2010 | Kennon et al. | |
| 2012/0039668 A1 | 2/2012 | Park et al. | |
| 2013/0124171 A1* | 5/2013 | Schuette | E21B 43/16 703/2 |
| 2014/0026085 A1 | 1/2014 | Amminudin et al. | |
| 2018/0202264 A1* | 7/2018 | Sarduy | G06N 20/00 |
| 2018/0240021 A1* | 8/2018 | Al-Harbi | G06F 30/20 |
| 2019/0065640 A1* | 2/2019 | Singh | E21B 43/00 |
| 2019/0169982 A1* | 6/2019 | Hauge | E21B 47/10 |
| 2019/0251460 A1 | 8/2019 | Lam | |
| 2019/0302310 A1* | 10/2019 | Fox | G01V 3/38 |
| 2020/0325766 A1 | 10/2020 | Gupta et al. | |
| 2020/0362674 A1* | 11/2020 | Alanazi | E21B 41/00 |
| 2021/0003540 A1* | 1/2021 | Rendl | G01N 30/38 |
| 2021/0003727 A1 | 1/2021 | Zhu et al. | |
| 2021/0027144 A1* | 1/2021 | Madasu | G06N 3/045 |
| 2021/0046265 A1 | 2/2021 | Obenchain | |
| 2021/0048547 A1 | 2/2021 | Nie et al. | |
| 2021/0079770 A1* | 3/2021 | Watson | E21B 47/11 |
| 2021/0109252 A1* | 4/2021 | Li | G06N 20/00 |
| 2021/0124087 A1* | 4/2021 | Liu | G06F 30/28 |
| 2021/0165938 A1* | 6/2021 | Bailey | G06N 3/047 |
| 2021/0181374 A1* | 6/2021 | Sandnes | G06F 30/18 |
| 2021/0190558 A1 | 6/2021 | Donzier et al. | |
| 2021/0224682 A1* | 7/2021 | Al-Nasser | G01V 20/00 |
| 2021/0225070 A1* | 7/2021 | Al-Nasser | G01V 20/00 |
| 2021/0246766 A1 | 8/2021 | Wilson | |
| 2021/0301659 A1 | 9/2021 | Al Shahri et al. | |
| 2022/0261513 A1* | 8/2022 | AlQahtani | E21B 47/08 |
| 2022/0290554 A1 | 9/2022 | Al Saad et al. | |
| 2022/0397698 A1* | 12/2022 | Bestman | G06F 30/28 |
| 2022/0414299 A1* | 12/2022 | Benzvi | G06N 20/20 |
| 2023/0041525 A1* | 2/2023 | Hong | G01V 3/38 |
| 2023/0153661 A1* | 5/2023 | Elkhomri | G06N 3/08 166/250.01 |
| 2023/0186218 A1 | 6/2023 | Bestman et al. | |

OTHER PUBLICATIONS

Ramgulam et al. (Utilization of Artificial Neural Networks in the Optimization of History Matching, SPE, 2007, pp. 1-15) (Year: 2007).*

Kamal, "Interference and Pulse Testing—A Review," SPE-10042-PA, Journal of Petroleum Technology, Dec. 1983, 14 pages.

International Search Report and Written Opinion in International Appln. No. PCT/US2023/083529, dated Apr. 5, 2024, 17 pages.

Back-Pressure Data On Natural-Gas Wells And Their Application To Production Practices, E.L. Rawlins, Lord Baltimore Press, 1935, 210 pages.

Mohamed et al., "Analysis of Multi-Layered Commingled and Compartmentalized Gas Reservoirs," Journal of Petroleum Exploration and Production Technology, Mar. 2018, 14 pages.

International Search Report and Written Opinion in International Appln No. PCT/US2023/083519, dated Mar. 25, 2024, 19 pages.

Buhulaigah et al., "Multilateral Wells Evaluation Utilizing Artificial Intelligence," presented at the SPE Middle East Oil & Gas Show and Conference, Manama, Bahrain, Mar. 2017, 12 pages.

SAIP Examination Report in Saudi Arabian Appln No. 122431214, dated Nov. 8, 2023, 20 pages, with English Translation summary.

SAIP Exam in Saudi Arabian Appln. No. 122431214, dated Jul. 28, 2024, 17 pages with English translation.

Ibrahim, "Optimizing Reservoir Management in South-Eastern Bangladesh: Insights from Type Curve Analysis," Jan. 2021, 13 pages.

* cited by examiner

FLOW-AFTER-FLOW TESTS IN HYDROCARBON WELLS

TECHNICAL FIELD

This disclosure relates to simulating flow-after-flow tests in hydrocarbon wells.

BACKGROUND

In the oil and gas industry, a flow-after-flow test (also referred to as a backpressure test or a four-point test) in a hydrocarbon well (for example, an oil or gas well) is conducted by producing the well at a series of constant flow rates and stabilized conditions for specified durations. Each flow rate is established in succession either with or without a very short intermediate shut-in period. The result is a reservoir signal that is interpreted (for example, by an analytical calculator) to determine a reservoir flow potential (for example, by measuring a bottom hole flow pressure [BHFP]). The reservoir signal can also be interpreted to determine well data that can be used for system analyses.

SUMMARY

In current practice, a flow-after-flow test is conducted in a hydrocarbon well by sending personnel to the well location to conduct the test. At the well location, the personnel take the hydrocarbon well offline in order to conduct the test. However, this process has several disadvantages. First, because the well is taken offline to perform the test, the production of the well is curtailed for the duration of testing. Second, because the test requires personnel to travel to the well location, testing may be hampered if environmental conditions do not permit the personnel to reach the well location (for example, stormy offshore weather may prevent personnel from travelling to an offshore location). These disadvantages impact the frequency, and in turn the utility, of flow-after-flow tests.

This disclosure describes methods and systems for simulating a flow-after-flow test in a hydrocarbon well. In an embodiment, a simulation system trains a machine learning model using historical well production data (for example, flow rates, flowing pressure, and flowing temperatures). The simulation system (or another system) uses the trained model to simulate a flow-after-flow test in the hydrocarbon well (or a related hydrocarbon well). In particular, the simulation system provides a particular flow rate of the hydrocarbon well as input to the trained model. The trained model simulates the flow-after-flow test for the hydrocarbon well at the particular flow rate, and provides as an output flowing pressures and flowing temperatures in the hydrocarbon well. The results of the simulation of the flow-after-flow can be used to detect flow potential of hydrocarbons, especially as reservoir pressure depletion occurs.

Innovative aspects of the subject matter described in this disclosure may be embodied in methods that include the actions of: receiving historical production data associated with a hydrocarbon well; preprocessing the historical production data to remove noise from the historical production data; using one or more machine-learning algorithms and the preprocessed historical production to train a simulation model to simulate a flow-after-flow test for the hydrocarbon well; and testing the simulation model to determine that the simulation model passes predetermined testing criteria.

Other embodiments of these aspects include corresponding systems, apparatus, and computer programs, configured to perform the actions of the methods, encoded on computer storage devices. These and other embodiments may each optionally include one or more of the following features.

In some implementations, an input of the simulation of the flow-after-flow test is an input flow rate of the hydrocarbon well and an output of the simulation of the flow-after-flow test is simulated flowing pressures and simulated flowing temperatures for the hydrocarbon well.

In some implementations, method 300 further involves determining a measure of quality of the preprocessed data, and determining that the measure of quality is greater than a predetermined threshold.

In some implementations, method 300 further involves receiving an input flow rate of the hydrocarbon well, and using the simulation model to simulate the flow-after-flow test for the hydrocarbon well.

In some implementations, method 300 further involves determining, based on an output of the simulation, an operating error in the hydrocarbon well, and in response to the determining the operating error, performing a corrective action.

In some implementations, the corrective action is outputting an alarm indicating the error or causing the hydrocarbon well to be removed offline.

Particular implementations of the subject matter described in this specification can be implemented so as to realize one or more of the following advantages. As an example, implementation of the subject matter allows flow-after-flow testing to be performed without taking the hydrocarbon well undergoing the testing offline or curtailing the well's production rate. As another example, implementation of the subject matter allows flow-after-flow testing to be performed without the need for personnel to travel to a well site, thereby improving the frequency and utility of flow-after-flow testing.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

This disclosure describes methods and systems for simulating a flow-after-flow test in a hydrocarbon well. In an embodiment, a simulation system trains a machine learning model using historical well production data (for example, flow rates, flowing pressure, and flowing temperatures). The simulation system (or another system) can use the trained model to simulate a flow-after-flow test in the hydrocarbon well. In particular, the simulation system provides a particular flow rate of the hydrocarbon well as input to the trained model. The trained model simulates the flow-after-flow test for the hydrocarbon well at the particular flow rate, and outputs flowing pressures and flowing temperatures in the hydrocarbon well. The results of the simulation of the flow-after-flow can be used to detect a flow potential of hydrocarbons, especially as reservoir pressure depletion occurs.

Figure 1:
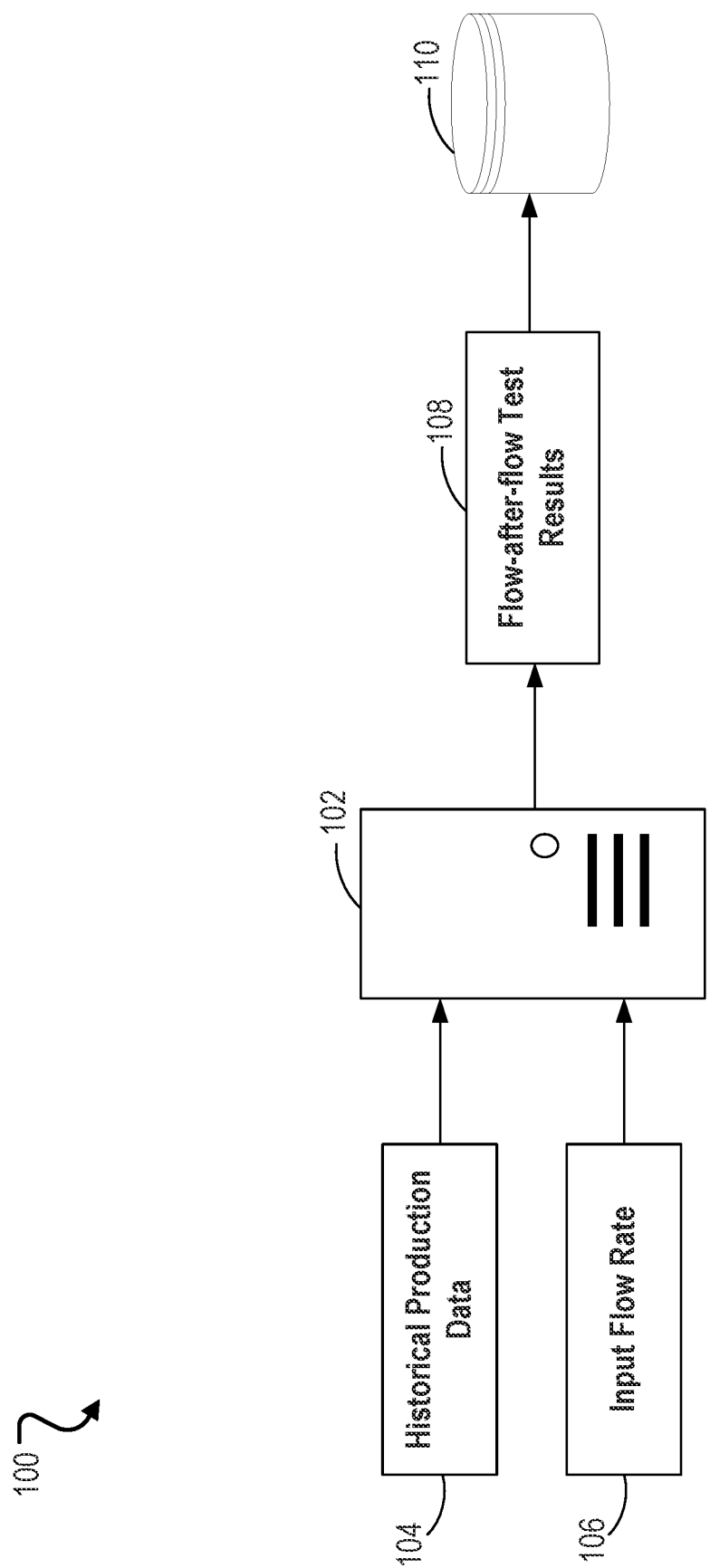
FIG. 1 illustrates a system for simulating a flow-after-flow test, according to some implementations.

FIG. 1 illustrates a simulation system 100 for simulating a flow-after-flow test in hydrocarbon wells, according to some implementations. In one embodiment, the simulation system 100 is implemented by a computing system, such as the computer system 400 of FIG. 4. Note that the simulation system 100 is shown for illustration purposes only, as the simulation system 100 may include additional components or have one or more components removed without departing from the scope of the disclosure. Further, note that the various components of the simulation system 100 can be arranged or connected in any manner.

As shown in FIG. 1, the simulation system 100 includes a computing device 102 that can communicate with one or more other computing systems (not shown in FIG. 1) over one or more networks (not shown in FIG. 1). The simulation system 100 also includes a data store 110, with the computing device 102 in communication with the data store 110. As described in more detail below, the simulation system 100 is configured to generate one or more models for simulating a flow-after-flow test for one or more hydrocarbon wells. Additionally, the simulation system 100 is configured to use the one or more models to simulate the flow-after-flow test for the one or more hydrocarbon wells.

In some embodiments, the computing device 102 is configured to operate in a training mode or in an application mode. In training mode, the computing device 102 generates new models for simulating a flow-after-flow test or refines existing models. To generate new models, the computing device 102 trains one or more models associated with one or more hydrocarbon wells. The computing device 102 performs the training uses historical production data 104 associated with the one or more hydrocarbon wells. The historical production data 104 includes at least one of flowing pressure data, flowing temperature data, or flow rate data associated with the one or more wells.

In one example, the computing device 102 generates a respective model for each of the hydrocarbon wells. In this example, the respective historical production data of each well is used to generate the model for that well. In another example, the computing device 102 generates a single model for a plurality of related wells (for example, wells that share the same platform). In this example, the computing device 102 uses the historical production data from the plurality of wells to generate the single model. And to refine existing models, the computing device 102 is tunes or modifies previously generated models, perhaps based on updated well production data.

In the application mode, the computing device 102 uses a trained model to simulate the flow-after-flow test for a hydrocarbon well. In particular, the computing device 102 obtains, perhaps via user input, an input flow rate 106 for the hydrocarbon well. Additionally, the computing device 102 obtains a model associated with the hydrocarbon well. The computing device 102 uses the model to simulate the flow-after-flow test in the hydrocarbon well based on the input flow rate 106. The output of the simulation is flow-after-flow test results 108, which includes flowing pressures and flowing temperatures in the hydrocarbon well at the input flow rate 106. The flow-after-flow test results 108 can be stored in the data store 110. As described in more detail below, the flow-after-flow test results 108 can be used for detecting abnormal well behavior, among other uses.

Figure 2:
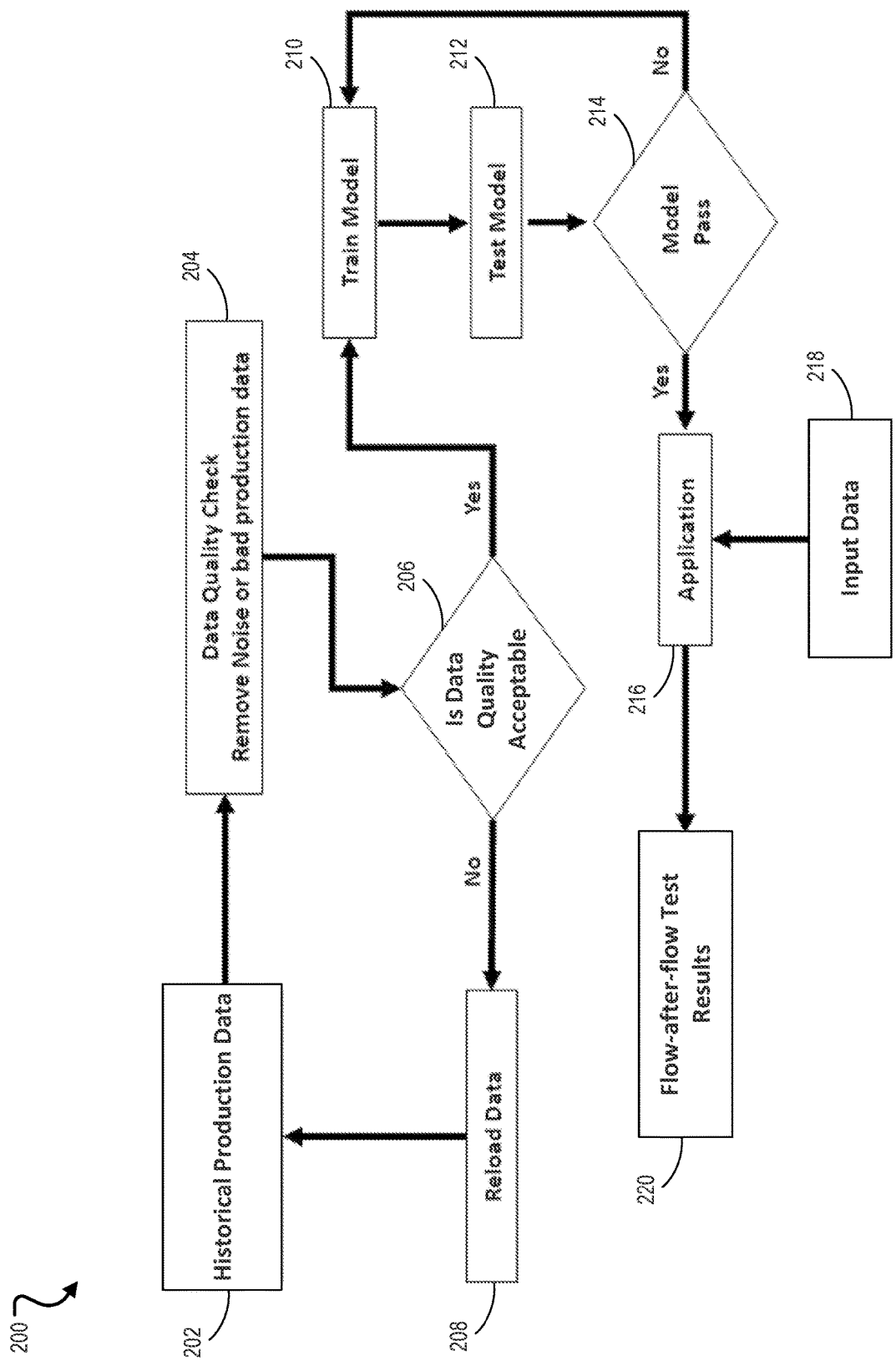
FIG. 2 illustrates a workflow for simulating a flow-after-flow test, according to some implementations.

FIG. 2 illustrates an example workflow 200 for simulating a flow-after-flow test, according to some implementations. In an implementation, the workflow 200 can be executed by a computing device, such as the computing device 102. For clarity of presentation, the description that follows describes the workflow 200 in the context of components in other figures of this disclosure. For example, the workflow 200 is described as being performed by the computing device 102 of FIG. 1. However, it will be understood that the workflow 200 can additionally or alternatively be performed by any suitable system, environment, software, hardware, or a combination of systems, environments, software, and hardware, as appropriate. Additionally, various steps of the workflow 200 can run in parallel, in combination, in loops, or in any order.

In some implementations, the workflow 200 includes a training phase and an application phase. The training phase includes steps 202-214 and the application phase includes step 216. Although the training phase and the application phase are described as being performed by the computing device 102, each phase can be executed by a different computing device. Furthermore, although the workflow 200 describes training one model for one hydrocarbon well, the workflow 200 can simultaneously train more than one model for more than one hydrocarbon well. Additionally or alternatively, the workflow 200 can train one model for a plurality of related hydrocarbon wells.

The training phase of the workflow 200 starts at step 202. At this step, the computing device 102 obtains historical production data associated with a hydrocarbon well. In an example, the historical production data includes at least one of flowing pressure data, flowing temperature data, and flow rate data associated with the hydrocarbon well. The well production data may have been measured at the surface, downhole, or both. Furthermore, the well production data may have been measured at the hydrocarbon well, a related hydrocarbon well, or both.

At step 204, the computing device 102 performs a data quality check of the historical production data. In one example, performing the data quality check involves removing noise or poor quality data from the historical production data. In this example, the computing device 102 normalizes the data in order to remove the noise. At step 206, the computing device 102 determines whether the quality of the historical production data is acceptable. In this step, the computing device 102 determines a measure of the data quality, for example, based on the noise in the data. The computing device 102 then compares the measure of the data quality to a predetermined threshold. If the quality measure is less than the predetermined threshold, the computing device 102 proceeds to step 208 of the workflow.

At step 208, the computing device 102 reloads new historical production data. In one example, the new data is newly acquired historical production data associated with the hydrocarbon well. As such, the newly acquired historical production data may be obtained from the hydrocarbon well, a related hydrocarbon well, or both. Once the computing device 102 loads the new data, the computing device 102 proceeds to step 202 and the workflow 200 is performed using the new historical production data.

Returning to step 206, if the quality measure of the historical data is equal to or greater than the predetermined threshold, the computing device 102 proceeds to step 210. At step 210, the computing device 102 uses the historical production data to train a model for simulating a flow-after-flow test. In this step, the historical production data serves as a training data set for the model. The model is trained to receive a reservoir flow rate as input and to provide upstream pressure and temperature as output. In one embodiment, the computing device 102 uses one or more machine learning algorithms to train the model. Generally, machine-learning can encompass a wide variety of different techniques that are used to train a machine to perform specific tasks without being specifically programmed to perform those tasks. The machine can be trained using different machine-learning techniques, including, for example, supervised learning. In supervised learning, inputs and corresponding outputs of interest are provided to the machine. The machine adjusts its functions in order to provide the desired output when the inputs are provided. Supervised learning is generally used to teach a computer to solve problems in which are outcome determinative. In one example, the machine learning algorithm is the Random Forest algorithm. This algorithm generally accounts for the high variance in reservoir pressure data. However, other example algorithms are also possible.

In another embodiment, the trained learning model may be embodied as an artificial neural network. Artificial neural networks (ANNs) or connectionist systems are computing systems inspired by the biological neural networks that constitute animal brains. An ANN is based on a collection of connected units or nodes, called artificial. Each connection, like the synapses in a biological brain, can transmit a signal from one artificial neuron to another. An artificial neuron that receives a signal can process it and then signal additional artificial neurons connected to it. In common ANN implementations, the signal at a connection between artificial neurons is a real number, and the output of each artificial neuron is computed by some non-linear function of the sum of its inputs. The connections between artificial neurons are called 'edges.' Artificial neurons and edges may have a weight that adjusts as learning proceeds (for example, each input to an artificial neuron may be separately weighted). The weight increases or decreases the strength of the signal at a connection. Artificial neurons may have a threshold such that the signal is only sent if the aggregate signal crosses that threshold. The transfer functions along the edges usually have a sigmoid shape, but they may also take the form of other non-linear functions, piecewise linear functions, or step functions. Typically, artificial neurons are aggregated into layers. Different layers may perform different kinds of transformations on their inputs. Signals travel from the first layer (the input layer), to the last layer (the output layer), possibly after traversing the layers multiple times.

Once the model is trained, the computing device 102 proceeds to step 212. At step 212, the computing device 102 tests the trained model. In one example, the computing device 102 uses known data sets to test the trained model. Here, the computing device 102 provides the model with an input that has a known output (for example, from the training data set). The computing device 102 compares the output of the model to the known output. For example, the computing device 102 uses root mean square error to compare the output of the model to the known output. The computing device 102 compares the difference between the output of the model and the known output (for example, the root mean square difference) to a predetermined threshold.

The computing device 102 then proceeds to step 214. At step 214, the computing device 102 determines if the model has passed the test. In particular, if the difference between the output of the model and the known output is greater than or equal to the predetermined threshold, the computing device 102 determines that the model has not passed the test. Conversely, if the difference between the output of the model and the known output is less than the predetermined threshold, the computing device 102 determines that the model has passed the test.

If the model has not passed the test, the computing device 102 returns to step 210 of training the model. At step 210, the computing device 102 retrains the model, perhaps using a different machine learning algorithm. Conversely, if the model passes the test at step 214, the training phase of the workflow 200 is complete. Once the training phase of the workflow 200 is complete, the application phase can be performed.

In some embodiments, the computing device 102 performs the application phase in response to a trigger. In one example, the trigger is a user input that requests the application to be performed. In another example, the computing device 102 is configured to periodically perform the application phase at defined intervals. In this example, the trigger is an expiration of a timer that tracks the time since the last performance of the application phase. In both examples, the computing device 102 initiates the application phase in response to the trigger.

Once the simulation phase is initiated, the computing device 102 proceeds to step 216 of performing a flow-after-flow test simulation. At step 216, the computing device 102 obtains input data 218, perhaps via user input or from another computing device. The input data 218 includes an input flow rate to provide to the model. In one example, the input flow rate is the flow rate of current production conditions in an existing hydrocarbon well. The computing device 102 provides the flow rate as input to the model, which in turn simulates a flow-after-flow test for the hydrocarbon well based on the flow rate. In particular, the model generates as an output flow-after-flow test results 220. In one example, the flow-after-flow test results 220 include at least one of a flowing pressure or a flowing temperature in the hydrocarbon well at the input flow rate.

In some embodiments, the computing device 102 (or another computing device) can use the flow-after-flow test results 220 to make decisions related to the operation of the hydrocarbon well. Additionally, the computing device 102 (or another computing device) can perform actions based on the decisions. As an example, the computing device 102 can use the flow-after-flow test results 220 to monitor operation of the hydrocarbon well in real-time. In this example, the computing device 102 obtains real-time production conditions of the hydrocarbon well. The computing device 102 compares the production conditions of the hydrocarbon well to the flow-after-flow test results 220 (for example, flowing pressure, flowing temperature, or both). If a difference between the production conditions and the flow-after-flow test results 220 is greater than a predetermined threshold, the computing device 102 responsively determines that an error has occurred in the operation of the hydrocarbon well. Additionally, the computing device 102 can responsively take a corrective action to correct the detected error. For instance, the computing device 102 can cause output of an alarm indicative of the error. Additionally and/or alternatively, the computing device 102 can control operation of the hydrocarbon well, for example, by changing the flow rate in the well or taking the well offline.

Figure 3:
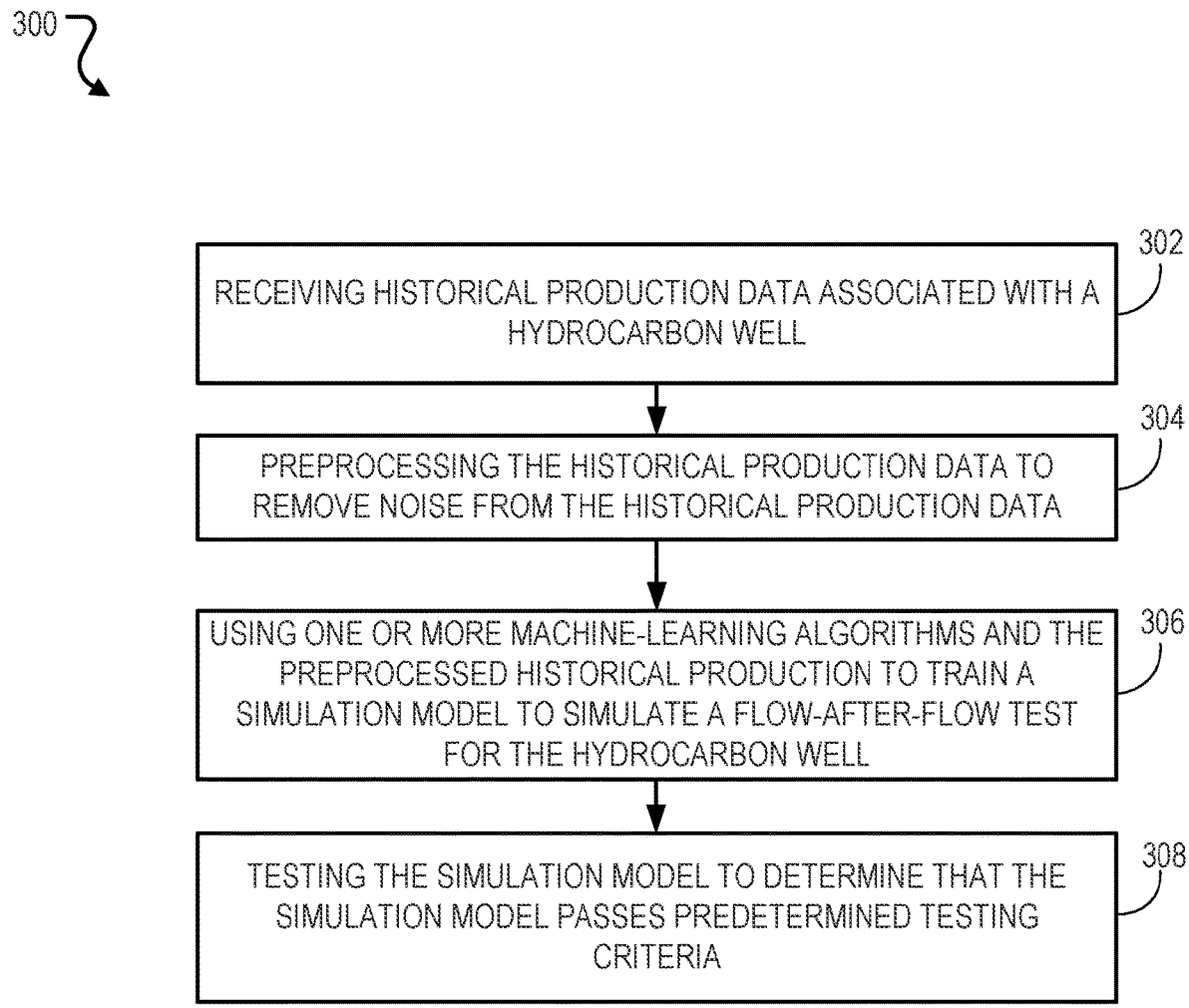
FIG. 3 illustrates a flowchart of an example method, according to some implementations.

FIG. 3 is a flowchart of an example method 300, according to some implementations. The method 300 is for simulating a flow-after-flow test for one or more hydrocarbon wells. For clarity of presentation, the description that follows generally describes method 300 in the context of the other figures in this description. However, it will be understood that method 300 can be performed, for example, by any suitable system, environment, software, hardware, or a combination of systems, environments, software, and hardware, as appropriate. In some implementations, various steps of method 300 can be run in parallel, in combination, in loops, or in any order.

At step 302, method 300 involves receiving historical production data associated with a hydrocarbon well. In some implementations, the historical production data includes flow rates, flowing pressure, and flowing temperatures. The historical production data may have been received from another computing system or from well sensors.

At step 304, method 300 involves preprocessing the historical production data to remove noise from the historical production data. In an example, preprocessing the historical production data involves normalizing the data in order to remove the noise. In some examples, preprocessing the data also involves determining whether the quality of the preprocessed data is acceptable. For instance, a measure of the data quality may be compared to a predetermined threshold. If the measure of the data quality is less than the predetermined threshold, then another preprocessing algorithm may be applied to the historical production data.

At step 306, method 300 involves using one or more machine-learning algorithms and the preprocessed historical production to train a simulation model to simulate a flow-after-flow test for the hydrocarbon well. Generally, machine-learning can encompass a wide variety of different techniques that are used to train a machine to perform specific tasks without being specifically programmed to perform those tasks. The machine can be trained using different machine-learning techniques, including, for example, supervised learning. In one example, the machine learning algorithm is the Random Forest algorithm. This algorithm generally accounts for the high variance in reservoir pressure data. However, other example algorithms are also possible.

At step 308, method 300 involves testing the simulation model to determine that the simulation model passes predetermined testing criteria. In one example, known data sets are used to test the trained model. Here, the model is provided with an input that has a known output (for example, from the training data set). The output of the model is then compared to the known output. For example, root mean square error is used to compare the output of the model to the known output. Then, the difference between the output of the model and the known output (for example, the root mean square difference) is compared to a predetermined threshold (that is, the predetermined testing criteria).

In some implementations, an input of the simulation of the flow-after-flow test is an input flow rate of the hydrocarbon well and an output of the simulation of the flow-after-flow test is simulated flowing pressures and simulated flowing temperatures for the hydrocarbon well.

In some implementations, method 300 further involves determining a measure of quality of the preprocessed data, and determining that the measure of quality is greater than a predetermined threshold.

In some implementations, method 300 further involves receiving an input flow rate of the hydrocarbon well, and using the simulation model to simulate the flow-after-flow test for the hydrocarbon well.

In some implementations, method 300 further involves determining, based on an output of the simulation, an operating error in the hydrocarbon well, and in response to the determining the operating error, performing a corrective action.

In some implementations, the corrective action is outputting an alarm indicating the error or causing the hydrocarbon well to be removed offline.

Figure 4:
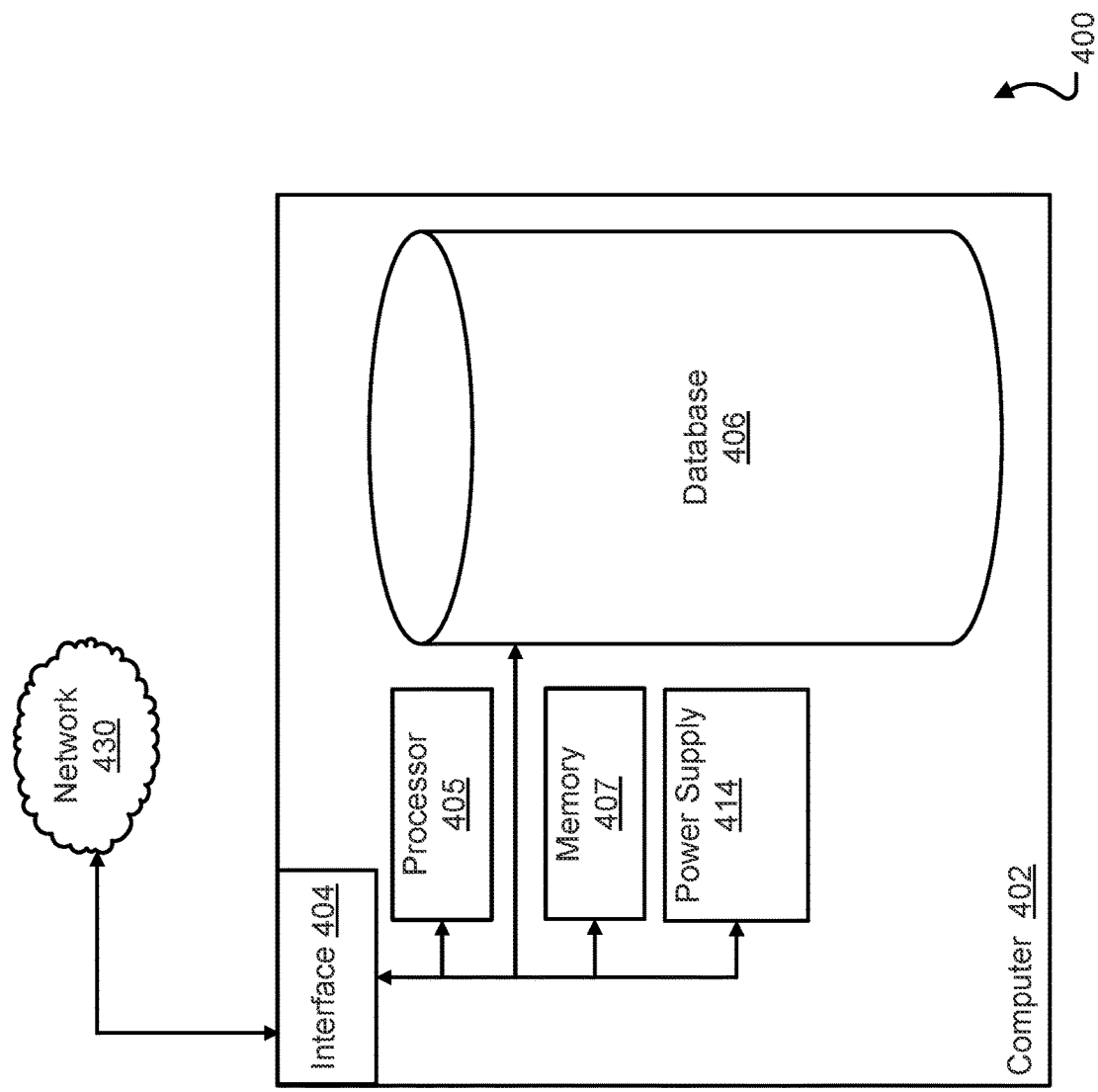
FIG. 4 illustrates an example computing environment for implementing the techniques described herein, according to some implementations.

FIG. 4 is a block diagram of an example computer system 400 that can be used to provide computational functionalities associated with described algorithms, methods, functions, processes, flows, and procedures described in the present disclosure, according to some implementations of the present disclosure. In some implementations, the simulation system 100 can be the computer system 400, include the computer system 400, or include part of the computer system 400. In some implementations, the simulation system 100 can communicate with the computer system 400.

The illustrated computer 402 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 402 can include a Smart Embedded Management Agent (SEMA), such as a built-in ADLINK SEMA 2.2, and a video sync technology, such as Quick Sync Video technology supported by ADLINK MSDK+. In some examples, the computer 402 can include the MXE-5400 Series processor-based fanless embedded computer by ADLINK, though the computer 402 can take other forms or include other components.

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus. In some implementations, any or all of the components of the computer 402, including hardware or software components, can interface with each other or the interface 404 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 402 and other components (whether illustrated or not) that are communicably coupled to the computer 402. The functionality of the computer 402 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 402, in alternative implementations, the API or the service layer can be stand-alone components in relation to other components of the computer 402 and other components communicably coupled to the computer 402. Moreover, any or all parts of the API or the service layer can be implemented as child or sub-modules of another software module, enterprise application, or hardware module without departing from the scope of the present disclosure.

The computer 402 can include an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 can also include a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

An application can be an algorithmic software engine providing functionality according to particular needs, desires, or particular implementations of the computer 402 and the described functionality. For example, an application can serve as one or more components, modules, or applications. Multiple applications can be implemented on the computer 402. Each application can be internal or external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system including computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:

1. A computer-implemented method, comprising:
   receiving, from well sensors, historical production data associated with a hydrocarbon well;
   preprocessing the historical production data to remove noise from the historical production data;
   using one or more machine-learning algorithms and the preprocessed historical production data to train a machine-learning model to simulate a flow-after-flow test for the hydrocarbon well, the machine-learning model accounting for variance in reservoir pressure data;
   testing the machine-learning model, using known data sets, to determine, by comparing to a threshold, a difference between an output of the machine-learning model and a known output, that the machine-learning model passes predetermined testing criteria;
   monitoring, using the machine-learning model, an operation of the hydrocarbon well in real-time to detect an operating error in the operation of the hydrocarbon well, the operation of the hydrocarbon well comprising flowing pressure and flowing temperature; and
   in response to detecting an operating error in the operation of the hydrocarbon well during the monitoring, performing a corrective action comprising modifying a flow rate of the hydrocarbon well.

2. The computer-implemented method of claim 1, wherein the historical production data comprises flow rates, flowing pressure, and flowing temperatures.

3. The computer-implemented method of claim 1, wherein an input to simulate the flow-after-flow test is an input flow rate of the hydrocarbon well and an output of the flow-after-flow test is simulated flowing pressures and simulated flowing temperatures for the hydrocarbon well.

4. The computer-implemented method of claim 1, wherein the method further comprises:
    performing a quality check of preprocessed data by removing noise from the preprocessed data generated by preprocessing the historical production data.

5. The computer-implemented method of claim 1, wherein the method further comprises:
    receiving an input flow rate of the hydrocarbon well; and
    using the machine-learning model to simulate the flow-after-flow test for the hydrocarbon well.

6. The computer-implemented method of claim 1, wherein
    the operating error indicates an abnormal well behavior.

7. The computer-implemented method of claim 1, wherein the corrective action is outputting an alarm indicating the operating error or causing the hydrocarbon well to be removed offline.

8. A non-transitory computer-readable storage media coupled to one or more processors and having instructions stored thereon which, when executed by the one or more processors, cause the one or more processors to perform operations comprising:
    receiving, from well sensors, historical production data associated with a hydrocarbon well;
    preprocessing the historical production data to remove noise from the historical production data;
    using one or more machine-learning algorithms and the preprocessed historical production data to train a machine-learning model to simulate a flow-after-flow test for the hydrocarbon well, the machine-learning model accounting for variance in reservoir pressure data;
    testing the machine-learning model, using known data sets, to determine, by comparing to a threshold, a difference between an output of the machine-learning model and a known output, that the machine-learning model passes predetermined testing criteria;
    monitoring, using the machine-learning model, an operation of the hydrocarbon well in real-time to detect an operating error in the operation of the hydrocarbon well, the operation of the hydrocarbon well comprising flowing pressure and flowing temperature; and
    in response to detecting an operating error in the operation of the hydrocarbon well during monitoring, performing a corrective action comprising modifying a flow rate of the hydrocarbon well.

9. The non-transitory computer-readable storage media of claim 8, wherein the historical production data comprises flow rates, flowing pressure, and flowing temperatures.

10. The non-transitory computer-readable storage media of claim 8, wherein an input to simulate the flow-after-flow test is an input flow rate of the hydrocarbon well and an output of the flow-after-flow test is simulated flowing pressures and simulated flowing temperatures for the hydrocarbon well.

11. The non-transitory computer-readable storage media of claim 8, wherein the operations further comprise:
    performing a quality check of preprocessed data by removing noise from the preprocessed data generated by preprocessing the historical production data.

12. The non-transitory computer-readable storage media of claim 8, wherein the operations further comprise:
    receiving an input flow rate of the hydrocarbon well; and
    using the machine-learning model to simulate the flow-after-flow test for the hydrocarbon well.

13. The non-transitory computer-readable storage media of claim 8, wherein:
    the operating error indicates an abnormal well behavior.

14. The non-transitory computer-readable storage media of claim 8, wherein the corrective action is outputting an alarm indicating the operating error or causing the hydrocarbon well to be removed offline.

15. A system, comprising:
    one or more processors; and
    a computer-readable storage device coupled to the one or more processors and having instructions stored thereon which, when executed by the one or more processors, cause the one or more processors to perform operations comprising:
        receiving, from well sensors, historical production data associated with a hydrocarbon well;
        preprocessing the historical production data to remove noise from the historical production data;
        using one or more machine-learning algorithms and the preprocessed historical production data to train a machine-learning model to simulate a flow-after-flow test for the hydrocarbon well, the machine-learning model accounting for variance in reservoir pressure data;
        testing the machine-learning model, using known data sets, to determine by comparing to a threshold, a difference between an output of the machine-learning model and a known output, that the machine-learning model passes predetermined testing criteria;
        monitoring, using the machine-learning model, an operation of the hydrocarbon well in real-time to detect an operating error in the operation of the hydrocarbon well, the operation of the hydrocarbon well comprising flowing pressure and flowing temperature; and
        in response to detecting an operating error in the operation of the hydrocarbon well during monitoring, performing a corrective action comprising modifying a flow rate of the hydrocarbon well.

16. The system of claim 15, wherein the historical production data comprises flow rates, flowing pressure, and flowing temperatures.

17. The system of claim 15, wherein to simulate the flow-after-flow test is an input flow rate of the hydrocarbon well and an output of the flow-after-flow test is simulated flowing pressures and simulated flowing temperatures for the hydrocarbon well.

18. The system of claim 15, wherein the operations further comprise:
    performing a quality check of preprocessed data by removing noise from the preprocessed data generated by preprocessing the historical production data.

19. The system of claim 15, wherein the operations further comprise:
    receiving an input flow rate of the hydrocarbon well; and
    using the machine-learning model to simulate the flow-after-flow test for the hydrocarbon well.

20. The system of claim 15, wherein:
    the operating error indicates an abnormal well behavior.

\* \* \* \* \*